Figure 1:
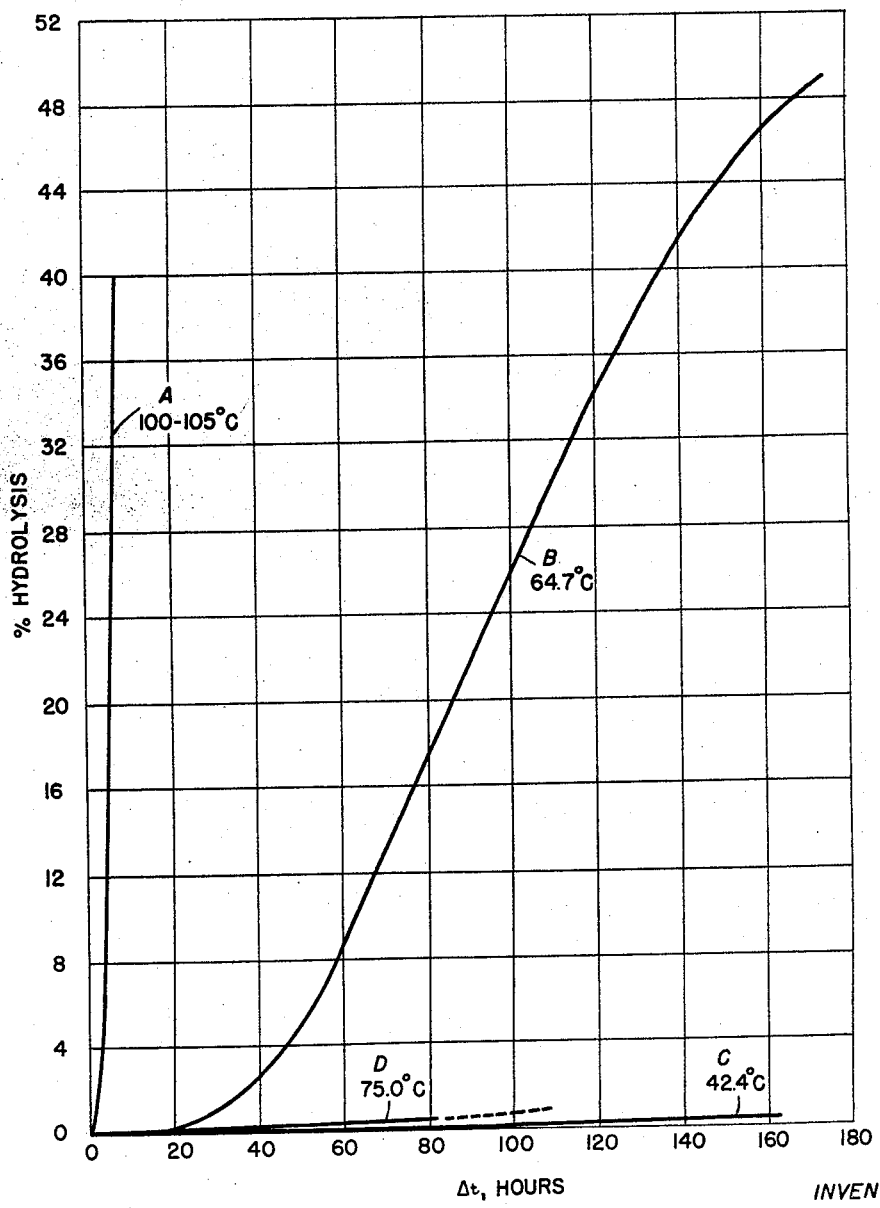
Figure 2:
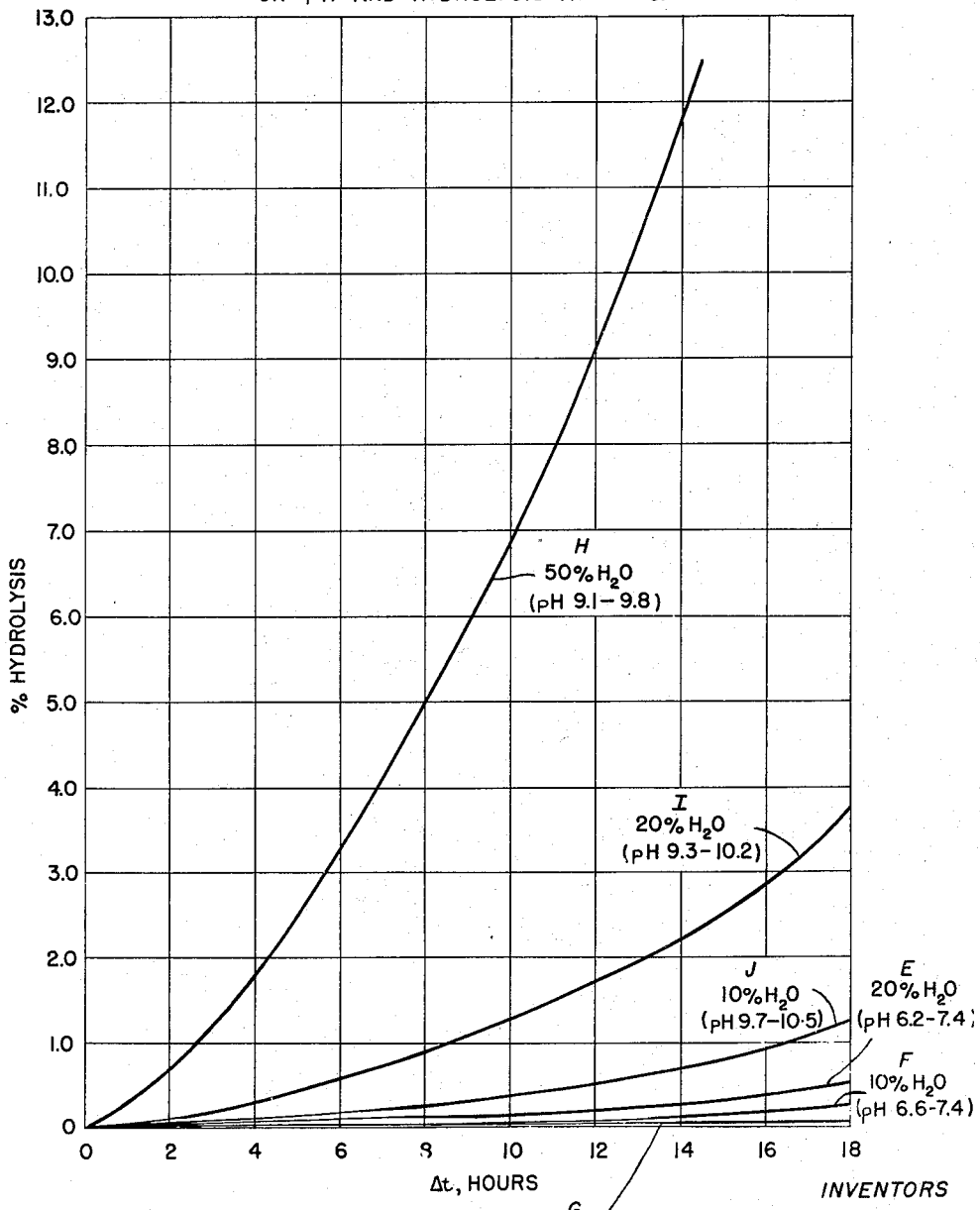
Figure 3:
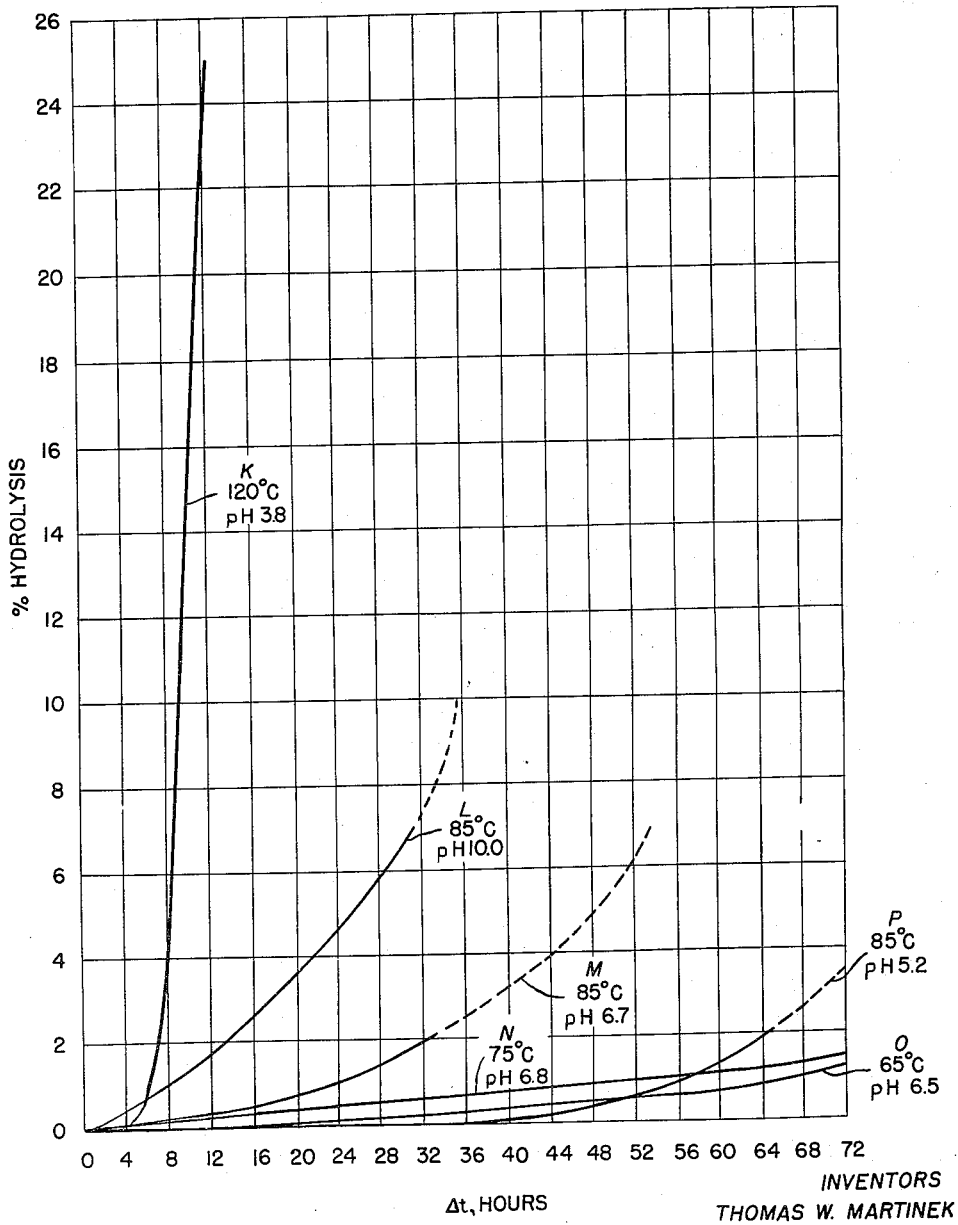
Figure 4:
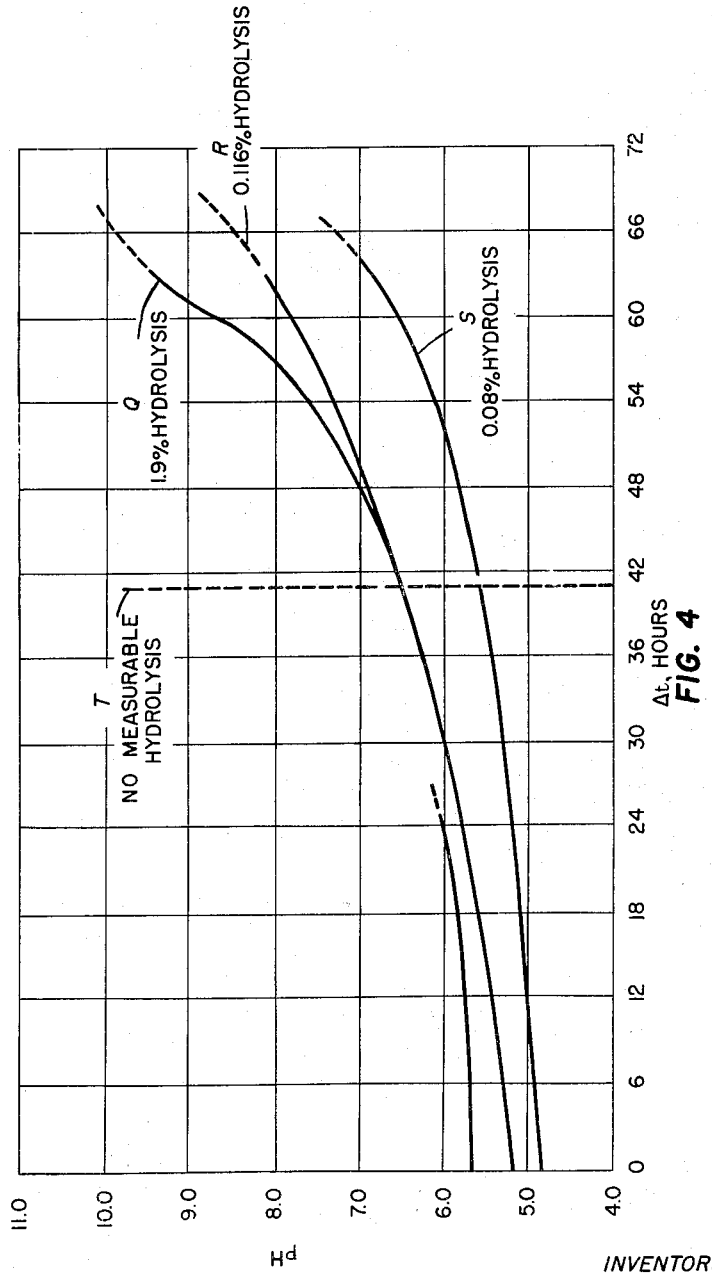

United States Patent Office 2,954,397
Patented Sept. 27, 1960

2,954,397
STABILIZATION OF CARBAMATE ESTERS AND EXTRACTION OF AROMATIC HYDROCARBONS THEREWITH

Thomas W. Martinek and Le Roi E. Hutchings, Crystal Lake, George W. Ayers, Chicago, and William A. Krewer, Arlington Heights, Ill., assignors to The Pure Oil Company, Chicago, Ill., a corporation of Ohio Filed Sept. 25, 1958, Ser. No. 763,364

16 Claims. (Cl. 260—482)

This invention relates to a method of stabilization of carbamate esters against decomposition during use, particularly during use as solvents in selective extraction processes. More particularly, the invention relates to the discovery that by incorporating small quantities of certain substances with the carbamate ester solvents to adjust and maintain the pH of the solvent within the range of about 4.5–7.0, preferably between about 4.5 to 5.5, the decomposition of the carbamate esters is prevented.

The preserving art has developed to the point where numerous inhibitors are known and used for the purpose of preventing polymerization and/or oxidation of organic materials. For instance, various antioxidants are known which prevent the oxidation of carbon double bonds in organic esters. It has been discovered in accordance with this invention that carbamate esters of the broad class to be described can exhibit two types of decomposition, namely, pyrolysis under conditions where an essentially anhydrous ester is subjected to elevated temperatures, and hydrolysis which occurs in the presence of water during long-time usage, as for example, in a solvent extraction process. In accordance with this invention, it has been discovered that the second type of decomposition can be inhibited by incorporating small quantities of certain inhibiting substances to maintain the pH of the solvent between about 4.5 and 7.0.

The carbamate esters with which the present invention finds utility are esters of carbamic acid, or N-substituted carbamic acids, in which the ester group contains at least one polar constituent. These compounds may be represented by the general formula:

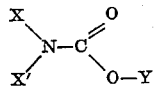

wherein X and/or X' are substituent groups which may broadly be hydrogen, alkyl, cycloalkyl, aryl, alkaryl, aralkyl, polar-substituted alkyl, polar-substituted aryl, or a heterocyclic radical, and Y is a polar-substituted alkyl, aryl, alkaryl, aralkyl, or cycloalkyl group. More specifically, X and/or X' may be substituents from the following groups: hydrogen, methyl, ethyl, propyl, isopropyl, butyl, isobutyl, tertiarybutyl, amyl, isoamyl, cyclopentyl, cyclohexyl, cycloheptyl, phenyl, tolyl, xylyl, hydroxymethyl, hydroxyethyl, hydroxypropyl, hydroxyisopropyl, hydroxybuyl, hydroxyisobutyl, hydroxyamyl, hydroxyisoamyl, cyanomethyl, cyanoethyl, cyanopropyl cyanobutyl, cyanoisobutyl, cyanoamyl, cyanoisoamyl, methoxymethyl, methoxyethyl, methoxypropyl, methoxyisopropyl, methoxybutyl, methoxyisobutyl, methoxyamyl, methoxyisoamyl, acetamidoethyl, acetamidopropyl, acetamidoisopropyl, acetamidobutyl, acetamidoisobutyl, acetamidoamyl, carboethoxyethyl, carboethoxypropyl, carboethoxyisopropyl, carboethoxybutyl and carboethoxyamyl. Additional specific substituent groups include nitrophenyl, e.g., 4-nitrophenyl, cyanophenyl, e.g., 4-cyanophenyl, morpholinyl, pyridyl, piperidinyl and the like.

Y in the above formula is a polar-substituted aryl, alkyl, alkaryl, aralkyl or cycloalkyl group including the aforementioned hydroxyalkyl, cyanoalkyl, methoxyalkyl, acetamidoalkyl and carboethoxyalkyl groups in relation to the definition of X and X'. Other polar groups that may be present in place of, or along with, the foregoing are the fluoro, chloro, iodo, and bromo radicals.

Carbamate esters of the foregoing class are used in a number of processes in which the stability of the esters over an extended period of time is of prime importance, particularly where the esters are subjected to temperatures higher than ambient temperatures. For example, β-hydroxyethyl dimethyl-carbamate is an excellent solvent extraction agent for aromatic hydrocarbons. This solvent is generally used with small quantities of water for the purpose of increasing the selectivity. In the practice of solvent extraction, the solvent is continually separated from the extract and raffinate phases by the application of water dilution and/or the use of an auxiliary non-polar solvent, which processes are followed by heating steps including distillation or flash-vaporization, wherein the solvent in admixture with water is heated to temperatures above 150° F. and as high as the boiling point of the particular esters. The recovered solvent from such processing is recycled to the primary extraction zone. Since the various steps of solvent extraction and recovery of solvent are known in the art and the invention herein does not depend on the use of the ester in any particular solvent extraction process, or, for that matter, to any use of the esters wherein decomposition may occur, no detailed description is necessary.

At ambient temperatures, the hydrolysis of β-hydroxyethyl dimethylcarbamate in the presence of about ¼ of its volume of water is practically negligible, even when the contact is over extended periods. At temperatures above approximately 178° F., the hydrolysis reaction rate increases rapidly.

Pyrolysis of β-hydroxyethyl dimethylcarbamate at elevated temperatures results in the production of dimethylammonium dimethylcarbamate, ethylene glycol and β-dimethylaminoethanol. This reaction takes place at a very slow rate and for all practical purposes may be ignored in the ordinary use of carbamate esters. However, in the hydrolysis reaction in the presence of water, particularly at high temperatures, β-hydroxyethyl dimethylcarbamate forms dimethylammonium dimethylcarbamate, ethylene glycol and carbon dioxide. Since carbon dioxide is evolved in the hydrolysis reaction, determination of its pressure forms a simple means of evaluating the stability of the ester compositions. Accordingly, the mixture of the carbamate ester, water and the additive under test, or used for stability, can be maintained at any definite temperature in a closed system and the rate of decomposition can be measured quantitatively by determining the pressure increase in the system due to release of carbon dioxide. The actual extent of the hydrolysis reaction and its products can be measured quantitatively by potentiometric titration of the mixture. After an individual test, the dimethylammonium dimethylcarbamate formed during the hydrolysis is readily titrated with hydrochloric acid. Stabilizing materials having a definite alkaline reaction cannot be evaluated by this method, and besides, appear to be ineffective.

The drawings are graphical representations, showing in each instance the hydrolytic stability of hydroxyethyl dimethylcarbamate, using the time in hours as the abscissas and the pH or percent hydrolysis as the ordinates, wherein:

Figure I shows the effect of temperature and fractionation on samples containing 50% by volume of water.

Figure II shows the effect of water concentration and of fractionation on the pH and rate of hydrolysis at 85° C.

Figure III incorporates the results of several experiments for comparison to show the effect of temperature and pH on samples containing 20% by volume of water.

Figure IV shows the relationship between pH and rate of hydrolysis at 85° C. for a solvent solution containing 20% of water.

In copending application Serial Number 735,829 filed May 16, 1958 by the instant inventors, there is described a process for mitigating the hydrolysis of carbamate esters at elevated temperatures by adding thereto certain acids and acid salts. In accordance with this copending application, it is the quantity of stabilizing agent, specified as a percentage of the material being stabilized, which is important. The instant invention distinguished thereover in that it has been established that the rate of hydrolysis is dependent upon the pH of the solvent solution, and that a reduction of the pH to within the range of about 4.5 to 7.0 results in a substantial reduction in the rate and extent of hydrolysis. It has further been found in accordance with this invention that the hydrolysis reaction can be substantially completely inhibited by maintaining the pH of the solvent solution at values between about 4.5 and 5.5. Control of the hydrogen ion concentration in accordance with this invention is best achieved by the addition of the requisite amount of an acid. As will be developed herein, phosphoric acid is the preferred stabilizing agent for this purpose.

The effects of hydrogen ion concentrations, temperature, water concentration, fractionation, and variations thereof on the extent of hydrolysis of a particularly efficient solvent, namely 2-hydroxyethyl dimethylcarbamate, were studied in a series of experiments. In a first series of nine experiments, results of which are shown in Table I, a general picture of the effect of time, temperature, pH and water concentration was obtained. These results were obtained by determining the percent hydrolysis of the various cited examples under the conditions shown by titration of the amine liberated in a sample dissolved in 100 gms. of distilled water.

TABLE I

*The hydrolysis of HEDMC as a function of time, temperature, pH, and dilution with water*

EFFECT OF TEMPERATURE, 50% WATER NON-FRACTIONED HEDMC

| Run 1 42.4° C. | | Run 2 64.7° C. | | Run 3 100–105° C. | |
|---|---|---|---|---|---|
| Time hrs. | Percent Hydrolyzed | Time hrs. | Percent Hydrolyzed | Time hrs. | Percent Hydrolyzed |
| 16 | 0 | 0 | 0 | 0.75 | 0.3 |
| 65 | 0 | 30 | 1.1 | 1.25 | 1.2 |
| 96 | 0.05 | 54 | 7.6 | 1.75 | 1.8 |
| 162 | 0.29 | 71 | 16.6 | 2.50 | 6.3 |
| | | 94 | 22.4 | 4.00 | 16.9 |
| | | 173 | 49.0 | 6.33 | 30.1 |

EFFECT OF CONCENTRATION, 65° C.— NON-FRACTIONATED HEDMC

| Run | 4 9.3% H₂O | | 5 20.1% H₂O | | 6 49.4% H₂O | |
|---|---|---|---|---|---|---|
| Time hrs | pH | Percent Hydrolyzed | pH | Percent Hydrolyzed | pH | Percent Hydrolyzed |
| 20 | 9.4 | 0.08 | 9.4 | 0.09 | 8.4 | 0.14 |
| 40 | 9.8 | 0.13 | 10.0 | 0.36 | 9.4 | 0.94 |
| 70 | 9.3 | 0.24 | 9.9 | 1.08 | 9.4 | 5.34 |
| 80 | 9.9 | 0.61 | 10.0 | 3.14 | 9.4 | 14.90 |

EFFECT OF CONCENTRATION, 75° C., FRACTIONATED HEDMC

| Run | 7 13.5% H₂O | | 8 19.4% H₂O | | 9 47.6% H₂O | |
|---|---|---|---|---|---|---|
| Time hrs. | pH | Percent Hydrolyzed | pH | Percent Hydrolyzed | pH | Percent Hydrolyzed |
| 2.3 | 7.2 | 0.06 | 6.8 | 0.07 | 6.5 | 0.08 |
| 4.0 | 6.8 | 0.07 | 6.8 | 0.09 | 6.4 | 0.08 |
| 5.5 | 7.0 | 0.08 | 6.8 | 0.13 | 6.7 | 0.09 |
| 14.0 | 7.2 | 0.14 | 7.0 | 0.19 | 6.6 | 0.11 |
| 24.0 | 7.0 | 0.24 | 7.1 | 0.35 | 6.6 | 0.12 |
| 55.0 | 7.5 | 0.96 | 7.6 | 1.47 | | |
| 73.5 | 7.7 | 1.47 | 8.8 | 2.69 | 6.8 | 0.35 |

In a second series of seven experiments, the effects of water concentration and pH adjustment were studied in a similar manner. These results are shown in Table II.

TABLE II

EFFECT OF CONCENTRATION AND INITIAL pH, 85° C.

| Run No. 10 50% H₂O | | | Run No. 11 20% H₂O | | | Run No. 12 10% H₂O | | |
|---|---|---|---|---|---|---|---|---|
| Time, hrs. | Percent Hydrolyzed at— | | Time, hrs. | Percent Hydrolyzed at— | | Time, hrs. | Percent Hydrolyzed at— | |
| | pH 6.4 [1] | pH 9.5 [1] | | pH 6.7 [1] | pH 10.0 [1] | | pH 6.8 [1] | pH 10.0 [1] |
| 1 | 0.01 | 0.25 | 2 | 0.01 | 0.10 | 3 | 0.02 | 0.08 |
| 2 | 0.02 | 0.63 | 4 | 0.04 | 0.30 | 6 | 0.06 | 0.24 |
| 3 | 0.02 | 1.18 | 6 | 0.08 | 0.58 | 9 | 0.08 | 0.37 |
| 4 | 0.02 | 1.90 | 10 | 0.15 | 1.41 | 12 | 0.11 | 0.56 |
| 8 | 0.03 | 5.13 | 16 | 0.40 | 2.81 | 20 | 0.27 | 1.38 |
| 14 | 0.05 | 11.70 | 24 | 1.06 | 4.94 | 30 | 0.57 | 2.27 |
| 20 | 0.08 | 17.80 | 32 | 1.95 | 7.05 | 56 | 1.81 | 4.62 |

[1] pH of solution at start of test period.

TABLE II—Continued

EFFECT OF pH ADJUSTMENT, 85°C., 20% H₂O

| Run No. | 13 | | 14 | | 15 | | 16 | |
|---|---|---|---|---|---|---|---|---|
| Initial pH | 5.7 | | 5.2 | | 4.9 | | 4.9 | |
| How Adjusted | HCl Added+Distilled | | HCl Added+Distilled | | HCl Added | | Acetic Acid Added | |
| Time, hrs | pH | Percent Hydrolyzed | pH | Percent Hydrolyzed | pH | Percent Hydrolyzed | pH | Percent Hydrolyzed |
| 4 | 5.7 | 0 | 5.3 | 0 | 5.3 | 0 | 4.9 | 0 |
| 8 | 5.7 | 0 | 5.4 | 0 | 5.4 | 0 | 5.0 | 0 |
| 12 | 5.7 | 0 | 5.5 | 0 | 5.4 | 0 | 5.0 | 0 |
| 16 | 5.8 | 0 | 5.6 | 0 | | | 5.2 | 0 |
| 24 | 6.0 | 0 | 5.8 | 0 | 5.9 | 0 | 5.3 | 0 |
| 40 | | | 6.4 | <0.01 | 6.5 | 0 | 5.5 | 0 |
| 64 | | | 9.8 | 1.9 | 8.3 | 0.12 | 7.1 | 0.08 |

In another series of tests, the extent of hydrolysis was studied for a solvent-water mixture in proportions and under conditions commonly encountered in solvent extraction processes. In conducting these experiments, portions of a solution of 80 volume percent of 2-hydroxyethyl dimethylcarbamate and 20% of water were held at 85° C. for extended periods of time after first having adjusted the pH of the solvent solution by the addition of an acid, and/or by distillation to remove basic constituents. The pH and extent of hydrolysis were determined periodically as before-described to give an indication of the effectiveness of the stabilization. From the experiments, it becomes apparent that a decrease in the pH results in increased resistance to hydrolysis. Results are shown in Table III.

TABLE III

*Effect of pH adjustment on hydrolysis*

[85° C., 20% H₂O]

| Initial pH | 10.0 | 6.7 | 5.7 | 5.2 | 4.9 |
|---|---|---|---|---|---|
| How adjusted | None | Distilled | HCl and Distilled | | Acetic Acid |
| Time, hrs | | | Percent Hydrolyzed | | |
| 2 | 0.10 | 0.01 | | | |
| 4 | 0.30 | 0.04 | 0 | 0 | 0 |
| 6 | 0.58 | 0.08 | | 0 | 0 |
| 8 | | | 0 | | |
| 10 | 1.41 | 0.15 | | 0 | 0 |
| 12 | | | 0 | 0 | 0 |
| 16 | 2.81 | 0.40 | 0 | 0 | 0 |
| 24 | 4.94 | 1.06 | 0 | 0 | 0 |
| 32 | 7.05 | 1.95 | | | |
| 40 | | | | +0.01 | 0 |
| 64 | | | | 1.9 | 0.08 |

Solutions comprising 80 volume percent of 2-hydroxyethyl dimethylcarbamate and 20% of water, with and without distillation, and with and without the addition of hydrochloric acid, were independently observed to be relatively non-corrosive as long as the pH was at or above about 4.5. These same solutions with pH's from about 4.4 to 2.0 exhibited increased corrosive effect on metal parts as the pH fell below 4.4 and at a pH of 2.0 the corrosivity was too high for commercial use.

As a further demonstration of the invention, portions of a solution of 2-hydroxyethyl dimethylcarbamate and water, as used in the experiments described in conjunction with Table III, were held at a temperature of about 105° C. for extended periods of time, while the pH was maintained within the range of about 4.5 to 5.0 by the periodic addition of dilute hydrochloric acid. The results of these experiments are shown in Table IV.

TABLE IV

*Hydrolytic stability of HEDMC (pH controlled)*

[Test Solution: 80% HEDMC, 20% H₂O+0.54 N HCl to pH 4–5]

| Time, hrs. | Temp., °C. | pH (±0.5 unit) | Acid added (0.54 N HCl), cubic centimeters | Percent Hydrolysis |
|---|---|---|---|---|
| 0 | 100.5 | 4.5 | 0 | 0 |
| 1 | 105.8 | 4.8 | 0 | ---------- |
| 4 | 106.0 | 4.8 | 0 | ---------- |
| 12 | 106.5 | 5.0 | 0 | ---------- |
| 25 | 106.2 | 4.8 | 0 | ---------- |
| 37 | 106.0 | 4.8 | 0 | ---------- |
| 50 | 106.4 | 4.8 | 0 | ---------- |
| 58 | 106.0 | 5.0 | 0 | ---------- |
| 59 | 106.0 | 5.5 | 0 | ---------- |
| 60 | 106.0 | 6.1 | 27.5 | 0.7 |
| 61 | 106.0 | 5.0 | 0 | ---------- |
| 68 | 106.3 | 5.0 | 0 | ---------- |
| 74 | 106.3 | 6.2 | 16.5 | [1] <1.0 |
| 75 | 106.0 | 4.5 | 0 | ---------- |
| 76 | 106.0 | 4.8 | 0 | ---------- |
| 84 | 105.5 | 4.8 | 0 | ---------- |
| 90 | 106.0 | 4.8 | 0 | ---------- |
| 94 | 106.9 | 4.8 | 0 | ---------- |

[1] By distillation of mixture and by CO₂ trapped, percent hydrolysis was less than 1.

It can be seen from the foregoing results that a small amount of hydrolysis occurred when the pH increased to about 5.0 from the formation of basic hydrolysis products. However, when the pH was adjusted to within the defined range, hydrolysis was substantially arrested.

The essentially critical effect of a pH range of about 4.5 to 5.0, or to as high as 7.0, is shown by careful examination of the data shown in Table IV. It is apparent that negligible or undetectable rise in pH occurred over a 58-hour period at a pH of about 5.0. However, in the next two hours a pH rise of 1 pH unit is shown, indicating the formation of basic products from the autocatalytic hydrolysis reaction. This rapid increase was arrested by the addition of hydrochloric acid to bring the pH to about 5.0. It will be noted that within the next 8 hours the pH was still about 5.0 but that 6 hours later it was 6.2. Since pH determinations are only accurate to about 0.5 unit, it may be that the pH during the first 37 hours was slightly below the pH from the 61st to the 68th hours. It is also probable that the actual pH from the 61st to the 68th hours was the same as the pH from the 50th to the 60th hours. This is confirmed by the pH determinations from the 75th to the 94th hours where the rate of change of pH was not sufficient to be measurable. Accordingly, since excessive corrosion results from using a pH of below about 4.5, the rate of hydrolysis is maintained at the lowest value and corrosion is mitigated when the pH is maintained between about 4.5 to 5.0.

These conclusions are verified by reference to the drawings. In Figure I, where the rate of hydrolysis is indicated by the slope of the curves and no attempt is made to control the pH, except to reduce the initial pH by fractionation, it appears that the rate of increase of hydrolysis is greatly accelerated at elevated temperatures. According to curve A, hydrolysis proceeds at an excessive rate when the temperature is 100–105° C. Curve B, showing the hydrolytic stability of 2-hydroxyethyl dimethylcarbamate at 64.7° C., also indicates a rapid breakdown of the solvent. The pH of the solution was about 8.4 at the start of the experiment and 9.4 after 80 hours. Curve C shows that hydrolysis is negligible at 42° C. The results for curve D at 75.0° C. are for a solvent that has been fractionated to remove the products of hydrolysis. This fractionation has the effect of lowering the pH, due to removal of alkaline products, and shows that the pH is an even more dominant factor than temperature on the stability of the carbamate solvents. Were it not for the lower pH, curve D would have been between curves A and B.

In Figure II, curves E, F and G show that when the pH is relatively low, the rate at which hydrolysis increases is lower for the solvent containing the greater amount of water. This slower rate of hydrolysis, though still not low enough for practical purposes, is undoubtedly due to the lower pH resulting from water dilution when the solutions tested to give curves E, F and G were fractionated. On the other hand, when the pH is already at a maximum, as shown by curves H, I and J, the rate of hydrolysis increase is proportional to the water content.

Figure III presents an interesting comparison at the 20% water concentration. Curve K shows the rate of increase of hydrolysis at 120° C. when the initial pH is 3.8 and the solvent solution is not fractionated. Curve L was obtained with a non-fractionated solvent solution at 85° C. when the initial pH was 10.0. Curve M was obtained with a fractionated solvent solution at 85° C. when the initial pH was lowered to 6.7. Curve N was obtained with a solvent solution at 75° C., fractionated at an initial pH of 6.8. Curve O shows the results obtained with a non-fractionated solvent solution at 65° C. when the pH was about 6.5. Curve P was obtained with a non-fractionated solvent solution at 85° C. when the pH was 5.2.

Figure III is important because a comparison of curves M, N and O, all run at a pH of 6.5 to 6.8, shows that even by decreasing the temperature at a pH outside the essentially critical pH range of this invention does not have a profound effect on the rate of hydrolysis. Also, by comparing curves L, M and P, all run at 85° C., the more pronounced effect of lowering the pH is noted.

Although some hydrolysis does occur within the pH range of 4.5 to 5.0, the rate of hydrolysis and the rate of increase of hydrolysis is so low that commercial operation is practicable. However, since one of the products of the hydrolysis is a base, the rate of hydrolysis increases as hydrolysis continues over extended periods of use of the solvent composition. The hydrolysis is thus base-catalyzed and autocatalytic. This is made more clear by reference to Figure IV wherein curve Q represents the results obtained for a solvent solution consisting of hydroxyethyl dimethylcarbamate and 20% of water, flash distilled to pH of 5.0. Curve R represents the results obtained with a solvent solution consisting of hydroxyethyl dimethylcarbamate and 20% of water with sufficient hydrochloric acid present to adjust the pH to about 5.0. Curve S represents the results obtained with a solvent composition consisting of hydroxyethyl dimethylcarbamate and 20% of water with 0.05% of acetic acid. The solvent solutions were each tested at 85° C. Dotted line T shows the dividing line between measurable hydrolysis on the right and non-measurable hydrolysis on the left.

Curves Q, R and S all have positive slopes indicating the disproportionate increase of pH with time and that the hydrolysis reaction is slowly accelerating. Curve Q is leveling off, showing that the pH rises faster and faster until it approaches the maximum pH attainable with the base produced from the hydrolysis. At this point, the rate of increase of hydrolysis decreases; however, the hydrolysis continues at this high level.

The curves in Figure IV also illustrate the effect of buffers and the essentially critical nature of the pH. The solvent represented by curve Q had no buffer, while the solvents represented by curves R and S were buffered with salts of hydrochloric and acetic acids. Curve Q exhibits a relatively sharp break at a pH of about 6.5–7.0, i.e., the slope of this curve changes radically at about this point and rises well above curve R. Curves R and S rise more steadily without a break-point or with lesser rates of increase. This is further demonstrated by a comparison of curves R and S showing that the former initially has a pH only slightly above that of the latter, but the slope of the former is always greater than the slope of the latter. Accordingly, a pH change of from 4.8 to 5.2 greatly increases the rate of hydrolysis, an important consideration in autocatalytic reactions. All solutions tested at a lower beginning pH than curve S showed relatively flat curves. At an optimum pH of about 4.5, the rate of hydrolysis is almost infinitesimal and only negligible amounts of buffer are required to prevent hydrolysis. When the pH increases disproportionately, more buffer is required to maintain the pH, which in turn controls the rate of hydrolysis.

The pH can be adjusted by adding any acid, such as hydrochloric, acetic, phosphoric, or other acidic materials. However, when certain acids are used, corrosion of processing equipment may become excessive. For example, the use of hydrochloric acid, while it effectively prevents hydrolysis, predisposes to high corrosion rates in steel and aluminum pipes and vessels if oxygen is present. We have determined the corrosiveness of solutions in which the pH has been adjusted to within the desired range by adding a number of different acids, and have found those solutions with the pH adjusted by the addition of phosphoric acid to be outstandingly non-corrosive even in the presence of oxygen. Therefore, its use is preferred.

We have shown that hydrolysis is decreased by decreasing the pH of the solvent solution, and that substantially complete inhibition is achieved at a pH of 4.5–5.5. A pH lower than 4.5 is not more effective than 4.5, and is to be avoided, since corrosiveness becomes economically and practically excessive. The pH should be maintained at a value of not more than about 7.0 for most applications.

Examples of polar-substituted carbamic acid esters coming within the scope of this invention are: 2-hydroxyethyl N-methyl carbamate, 2-hydroxyethyl N-ethyl carbamate, 2-hydroxyethyl N-i-propyl carbamate, 2-hydroxyethyl N,N-dimethyl carbamate, 2-chloroethyl N-methyl carbamate, 2-chloroethyl N-ethyl carbamate, 2-chloroethyl N-isopropyl carbamate, 2-chloroethyl N,N-dimethyl carbamate, 3-chloropropyl N-methyl carbamate, 3-chloropropyl N-ethyl carbamate, 3-chloropropyl N-isopropyl carbamate, 3-chloropropyl N,N-dimethyl carbamate, 2-iodoethyl N-methyl carbamate, 2-iodoethyl N-ethyl carbamate, 2-iodoethyl N-i-propyl carbamate, 2-iodoethyl N,N-dimethyl carbamate, 2-fluoroethyl N-methyl carbamate, 2-fluoroethyl N-ethyl carbamate, 2-fluoroethyl N-i-propyl carbamate, 2-fluoroethyl N-N-dimethyl carbamate, 2-bromoethyl N-methyl carbamate, 2-bromoethyl N-ethyl carbamate, 2-bromoethyl N-i-propyl carbamate, 2-bromoethyl N,N-dimethylcarbamate, hydroxyphenyl N-methyl carbamate, hydroxyphenyl N-ethyl carbamate, hydroxyphenyl N-isopropyl carbamate, hydroxyphenyl N,N-dimethyl carbamate and chlorophenyl N-methyl carbamate.

The physical properties of certain of these carbamates are shown in the following table:

TABLE V

*Physical properties of carbamates tested*

| Carbamate | B. P. (°C./mm.Hg) | B. P.(Calc.) (°C. @ 760 mm.) | R. I. ($n^{20}/D$) |
|---|---|---|---|
| 2-hydroxyethyl N-methyl | 107–108/1.2 | 290 | 1.4516 |
| 2-hydroxyethyl N-ethyl | 139–142/8 | 275 | 1.4532 |
| 2-hydroxyethyl N-i-propyl | 114–222/0.5 | 335 | 1.4520 |
| 2-hydroxyethyl N,N-dimethyl | 82–86/1.2 | 245 | 1.4497 |

This invention finds particular application in the use of the polar-substituted carbamic acid esters in liquid-liquid or liquid-vapor solvent extraction systems wherein the objective is to extract the aromatic hydrocarbons or alkyl-substituted homologues from admixture with non-aromatic hydrocarbons. For this purpose, the feed hydrocarbons containing the desired aromatics are treated in a single tower, or in a series of towers, with one or more successive portions, or are treated continuously with the carbamate solvent. The proportions of solvent, or the solvent-to-feed ratio, in the successive or continuous treatments may vary in accordance with the extent of extraction sought. The process may be batchwise and countercurrent flow in a vertical tower may be used.

In order to illustrate this aspect of the invention the feed hydrocarbons containing aromatics are introduced into a primary extraction tower wherein the feed passes in countercurrent contact with a carbamate solvent which has its pH adjusted to a value of not more than about 7.0. This treatment results in a raffinate containing a small amount of solvent and a predominance of the non-aromatic hydrocarbons, and an extract phase containing solvent and a high proportion of aromatics. The raffinate phase is treated to water-washing in order to remove the small amount of carbamate solvent therefrom and the solvent so recovered is recycled to the primary extraction tower. The extract phase may be distilled in order to remove the solvent. About 5 to 20% by weight of water is used with the solvent during the extraction. Accordingly, the distillation results in an overhead of semi-purified aromatic hydrocarbons and a bottoms fraction which comprises the solvent-water mixture to be recycled to the primary extraction. This bottoms fraction is tested to make sure the pH is not more than about 7.0 and then is recycled to the primary extraction tower, with or without an adjustment of the water content to the desired range in accordance with the degree of extraction that is to be accomplished. The extract phase may also be treated with a high-boiling paraffinic hydrocarbon, containing no contaminating unsaturated hydrocarbons, to dissolve the aromatics and produce a denuded solvent phase. Following this treatment, the denuded solvent phase is treated to adjust the pH in accordance with this invention and likewise recycled to the primary extraction tower.

In order to further demonstrate the invention with a non-limiting example, an aromatic feed composition consisting of 32% by volume of benzene and 68% by volume of paraffins was treated in an extraction tower with a solvent consisting of 80% by volume of N,N-dimethyl-2-hydroxyethyl carbamate and 20% by volume of water, using the following operating conditions in the tower:

Extraction tower operating conditions:
  Solvent/feed ratio _____ 6/1
  Reflux/feed ratio _____ 1.7/1
  Solvent rate _____gal./hr__ 3.0
  Feed rate _____gal./hr__ 0.51
  Reflux rate _____gal./hr__ 0.88

The extract was distilled with water reflux, at a still-pot temperature of 229° F. The paraffin product was washed with water to remove any trace amounts of solvent present. The solvent was treated with acid to bring the pH to a value of about 5.0. This procedure completely eliminated hydrolysis of the solvent during the distillation step. The following product rates and compositions were obtained:

Product rates and compositions:
  Benzene _____ 0.16 gal./hr.
                             99% by vol. benzene.
                             1% by vol. paraffins.
  Paraffin product _____ 0.35 gal./hr.
                             1% by vol. benzene.
                             99% by vol. paraffin.

When applying the method of this invention to a solvent extraction process, the technique of maintaining the pH at a value of not more than about 7.0, but preferably no lower than about 4.5, is applicable to recovery of economic amounts of aromatics, including benzene and alkyl homologues thereof such as toluene, xylenes and ethylbenzene. Such feed materials as petroleum distillates, naphthas, gasoline, kerosene, fuel oil fractions and gas-oil fractions may also be subjected to solvent extraction with the carbamate esters disclosed herein while applying the technique of stabilization by pH control which constitutes this invention. One suitable feed is the class of products known in the art as catalytic reformates which contain considerable quantities of aromatics. Catalytic reformates are obtained by subjecting naphthas to reforming, dehydrogenation, hydrocracking and dehydrocyclization processes at temperatures ranging from 850° F. to 1000° F., and pressures up to about 500 p.s.i.g., in the presence of a metal-containing catalyst.

As a more specific illustration, catalytic reformates obtained as a result of the treatment of a virgin naphtha (BR 175° F.–400° F., API gravity 50° to 60°) with a platinum-alumina catalyst at 875° F. to 975° F., and pressures ranging from 200 to 500 p.s.i.g., may be used. Reformates so produced contain from about 30 to 55 vol. percent of aromatics and constitute a preferred feed for the present process. For example, reformates produced by reforming a 200°–400° F. virgin naphtha at about 930° F. and 325 p.s.i.g. in the presence of a catalyst comprising about 0.1 wt. percent of platinum on an alumina base, are representative. In general, these reformates have a boiling range of about 125° to 400° F., an API gravity of 40° to 50°, and an aromatic content of 45–55 volume percent. A particularly suitable reformate is obtained by subjecting a charge naphtha having a boiling range of 178° F. to 389° F., an API gravity of 59.1°, a RON clear, of 44.6, a RON+0.3 TEL of 71.4, and containing 0.01% sulfur, about 91.0 vol. percent of paraffins and naphthenes, 1.0 vol. percent olefins, and 8.0 vol. percent aromatics, to reforming at about 930° F., to produce a product having an API gravity of 49.2°, an IBP of 128° F. and EBP of 405° F., a RON, clear, of 89.4, a RON+.3 cc. TEL of 98.2, and containing about 48.0 vol. percent paraffins and naphthenes, 1.0 vol. percent olefins and 51.0 vol. percent of aromatics. By precise fractionation and blending to different octane numbers, it was determined that this reformate feed material exhibited the following analysis:

TABLE VI

*Aromatics in reformate feed*

| Aromatic: | Vol. Percent |
|---|---|
| Benzene | 4.19 |
| Toluene | 13.1 |
| Mixed xylenes and ethylbenzene | 16.51 |
| $C_9$ and heavier | 17.2 |

In general, the technique of stabilization by careful adjustment of the pH in accordance with this invention is applicable to a wide range of conditions under which the carbamate esters disclosed herein may be used. Hydrolysis and other decomposition of these carbamate esters proceeds more rapidly at elevated temperatures and is less of a problem at low temperatures. In general, these carbamate esters require stabilization at temperatures from about 20° C. to 190° C. The manipulation of the invention finds particular application during solvent extraction operations wherein temperatures ranging from about 0° C. to as high as 80° C. are used with pressures ranging from atmospheric to 10 or 15 p.s.i.g.

What is claimed is:

1. The method of stabilizing N-substituted alkyl carbamates which comprises adjusting the pH of the carbamates to between about 4.5 and 7.0 and continuously maintaining the pH of the carbamates within said limits.

2. Method in accordance with claim 1 in which the pH is adjusted by addition to the carbamates of phosphoric acid.

3. The method of stabilizing N-substituted alkyl carbamates against hydrolysis during use in contact with water which comprises adjusting the carbamates to a pH between about 4.5 and 7.0 and continuously maintaining the pH of the carbamates within said limits.

4. The method of stabilizing N-substituted alkyl carbamates which comprises adjusting the pH of the carbamates to within the range of about 4.5 to 5.5 and continuously maintaining the pH of the carbamates within said range.

5. Method in accordance with claim 4 in which the pH is adjusted by addition to the carbamates of phosphoric acid.

6. The method of stabilizing N-substituted alkyl carbamates against hydrolysis during use in contact with water which comprises adjusting the carbamates to a pH between about 4.5 to 5.5 and continuously maintaining the pH of the carbamates within said limits.

7. The method of stabilizing N-substituted alkyl carbamates against hydrolysis during use as selective solvents in contact with water which comprises adjusting the carbamates to a pH between about 4.5 and 7.0 and continuously maintaining the pH within said limits.

8. The method of stabilizing N-substituted alkyl carbamates against hydrolysis during use as selective solvents in contact with water which comprises adjusting the carbamates to a pH between about 4.5 and 5.5.

9. The method of stabilizing carbamate esters of the general formula

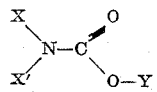

wherein X and X' are the same or different substituent radicals selected from the group consisting of hydrogen, alkyl, cycloalkyl, aryl, alkaryl, aralkyl, polar-substituted alkyl, polar-substituted aryl and heterocyclic radicals, and Y is selected from the group of polar-substituted alkyl, polar-substituted aryl, polar-substituted alkaryl, polar-substituted aralkyl and polar-substituted cycloalkyl radicals, which comprises adjusting the pH of the carbamate esters to between about 4.5 and 7.0 and continuously maintaining the pH of said esters within said limits.

10. The method in accordance with claim 9 in which said carbamate ester is 2-hydroxyethyl N,N-dimethyl carbamate.

11. The method in accordance with claim 9 in which said carbamate ester is 2-hydroxyethyl N-methyl carbamate.

12. The method in accordance with claim 9 in which said carbamate ester is 2-hydroxyethyl N-isopropyl carbamate.

13. The method in accordance with claim 9 in which said pH is maintained by the addition of controlled quantities of an acidic material.

14. The method in accordance with claim 9 in which said pH is maintained by distillation of said solvent to remove basic materials therefrom.

15. The process of separating aromatic hydrocarbons from a mixture with paraffinic hydrocarbons which comprises contacting said mixture with a polar N-substituted carbamate solvent in an extracting treatment in the presence of water, separating the composite mixture into two components consisting of an extract phase and a raffinate phase, separating paraffinic hydrocarbons and solvent from said raffinate phase, separating aromatic hydrocarbons and solvent from said extract phase, adjusting the pH of the solvent phases to a value between 4.5 and 7.0 and continuously maintaining the pH of the solvent within said limits while recycling said solvent to said extracting treatment.

16. The method in accordance with claim 15 in which the polar N-substituted carbamate solvent is 2-hydroxyethyl N-methyl carbamate and the pH of the solvent is adjusted by addition of phosphoric acid.

References Cited in the file of this patent

UNITED STATES PATENTS

| | | |
|---|---|---|
| 2,333,917 | Christ et al. | Nov. 9, 1943 |
| 2,386,927 | Boyd | Oct. 16, 1945 |
| 2,594,044 | Loder | Apr. 22, 1952 |
| 2,620,349 | Slocombe | Dec. 2, 1952 |
| 2,666,752 | Grummit et al. | Jan. 19, 1954 |
| 2,692,874 | Langerak | Oct. 26, 1954 |
| 2,863,856 | Hetzel | Dec. 9, 1958 |

UNITED STATES PATENT OFFICE

CERTIFICATE OF CORRECTION

Patent No. 2,954,397            September 27, 1960

Thomas W. Martinek et al.

It is hereby certified that error appears in the printed specification of the above numbered patent requiring correction and that the said Letters Patent should read as corrected below.

Column 1, line 63, for "hydroxybuyl" read -- hydroxybutyl --; column 11, line 43, before the period and after "5.5", insert -- and continuously maintaining the pH within said limits --.

Signed and sealed this 11th day of April 1961.

(SEAL)
Attest:

ERNEST W. SWIDER
Attesting Officer

ARTHUR W. CROCKER
Acting Commissioner of Patents